United States Patent
Goodwin et al.

(10) Patent No.: US 12,124,614 B2
(45) Date of Patent: Oct. 22, 2024

(54) APPARATUS AND METHODS FOR VERIFYING A FILE ORIGIN

(71) Applicant: Sage Global Services Limited, Newcastle upon Tyne (GB)

(72) Inventors: Michael Stuart Goodwin, Whitley Bay (GB); Jaya Teyjas, Sydney (AU); Klaus-Michael Vogelberg, Newcastle upon Tyne (GB); Christopher Ian Latimer, Newcastle upon Tyne (GB)

(73) Assignee: Sage Global Services Limited, Newcastle upon Tyne (GB)

( * ) Notice: Subject to any disclaimer, the term of this patent is extended or adjusted under 35 U.S.C. 154(b) by 444 days.

(21) Appl. No.: 17/109,221

(22) Filed: Dec. 2, 2020

(65) Prior Publication Data

US 2021/0165915 A1 Jun. 3, 2021

(30) Foreign Application Priority Data

Dec. 2, 2019 (GB) .................................. 1917568.6

(51) Int. Cl.
G06F 21/64 (2013.01)
G06F 16/13 (2019.01)
G06F 21/60 (2013.01)

(52) U.S. Cl.
CPC ............ *G06F 21/64* (2013.01); *G06F 16/137* (2019.01); *G06F 21/602* (2013.01)

(58) Field of Classification Search
CPC ....... G06F 21/64; G06F 16/137; G06F 21/602
See application file for complete search history.

(56) References Cited

U.S. PATENT DOCUMENTS

| | | |
|---|---|---|
| 2005/0086472 A1 | 4/2005 | Peha |
| 2017/0134162 A1 | 5/2017 | Code et al. |
| 2019/0361867 A1 | 11/2019 | Nilsson et al. |
| 2020/0112427 A1* | 4/2020 | Nakamura ............ H04L 9/0637 |

(Continued)

FOREIGN PATENT DOCUMENTS

WO 2018/064487 A1 4/2018

OTHER PUBLICATIONS

Bhowmik, Deepayan and Feng, Tian, The Multimedia Blockchain: A Distributed and Tamper-Proof Media Transaction Framework, Department of Computing, Sheffield Hallam University, 5 pages.

(Continued)

*Primary Examiner* — Michael R Vaughan
*Assistant Examiner* — Ladimir I Gavrilenko
(74) *Attorney, Agent, or Firm* — Barnes & Thornburg LLP

(57) ABSTRACT

Apparatus configured to obtain a hash of a file to be transmitted to a second apparatus and an indication of a file creator of the file; retrieve an identifier associated with the file creator; store the hash of the file, associated with the identifier of the file creator, in an immutable ledger; obtain the hash of the file from the second apparatus; verify that the hash of the file is stored in the immutable ledger; retrieve, from the immutable ledger, one or more assertions associated with the file; retrieve, from the immutable ledger, the associated identifier of the file creator using the hash of the file; and transmit, to the second apparatus: a confirmation that the file is from the file creator; and at least one of the one or more assertions associated with the file.

19 Claims, 7 Drawing Sheets

(56) References Cited

U.S. PATENT DOCUMENTS

2020/0201964 A1\* 6/2020 Nandakumar ...... H04L 63/0861
2020/0382310 A1\* 12/2020 Jayachandran ....... H04L 9/3239

OTHER PUBLICATIONS

European Search Report for Application No. 20209911.5-1213, dated Apr. 14, 2021, 11 pages.
United Kingdom Intellectual Property Office, Search Report for related Patent Application No. GB1917568.6, May 12, 2020, 3 pages.
European Patent Office, Examination Report for related European Patent Application No. 20209911.5, Oct. 20, 2023, 10 pages.

\* cited by examiner

APPARATUS AND METHODS FOR VERIFYING A FILE ORIGIN

CROSS-REFERENCE TO RELATED APPLICATION

This application claims priority under 35 U.S.C. § 119 to United Kingdom Patent Application No. GB 1917568.6, filed Dec. 2, 2019, the entire disclosure of which is incorporated herein by reference.

BACKGROUND

A recipient apparatus, upon receiving a file (e.g. a software update, request for data/response, or an electronic document), may wish to confirm that the purported origin or sender of the file is who the file indicates the sender to be. For example, a file may appear to be from a trusted or expected sender (e.g. a known software or service provider) but the sender identity may have been forged or spoofed, or the contents of the file may have been tampered with, by a malicious sender. Improved communication security may be obtained if a way of confidently verifying the origin, creator, or contents of a received file, possibly automatically, could be achieved.

A recipient apparatus of a file and/or a creator of the file may, in some examples, wish to link further data with a received file. For example such further data may indicate that the file has been processed or transmitted to a further recipient. Providing such data in a way that the data is linked to the correct file and is not, for example, used against a different file (through error or malicious intent) may be beneficial.

It is an object of embodiments of the invention to at least mitigate one or more of the problems of the prior art.

SUMMARY

In an aspect, there is provided an apparatus for verifying an origin of a transmitted file. The apparatus is configured to: obtain a hash of a file to be transmitted to a second apparatus and an indication of a file creator of the file; retrieve an identifier associated with the file creator; store the hash of the file, associated with the identifier of the file creator, in an immutable ledger; obtain the hash of the file from the second apparatus; verify that the hash of the file is stored in the immutable ledger; retrieve, from the immutable ledger, one or more assertions associated with the file; retrieve, from the immutable ledger, the associated identifier of the file creator using the hash of the file; and transmit, to the second apparatus: a confirmation that the file is from the file creator; and at least one of the one or more assertions associated with the file.

The apparatus may be configured to transmit, to the second apparatus, profile information about the file creator.

The hash of the file may be cryptographically associated with the identifier of the file creator. At least one of the one or more assertions may be cryptographically associated with the file.

The apparatus may be configured to: retrieve, from the immutable ledger, a timestamp indicating when the hash was originally recorded in the immutable ledger; and transmit the timestamp to the second apparatus.

The apparatus may be configured to store one or more file creator assertions associated with the file creator in the immutable ledger.

The apparatus may be configured to: retrieve one or more assertions recorded in the immutable ledger and associated with the file creator; and transmit an indication of the one or more assertions associated with the file creator to the second apparatus. The one or more assertions associated with the file creator may indicate a security level of the file creator. The one or more assertions associated with the file creator may have a further one or more assertions added, thereby accumulating assertions associated with the file creator.

The apparatus may be configured to obtain the hash of the file to be transmitted to the second apparatus by one or more of: receiving the file to be transmitted from a sending apparatus, and hashing the file to obtain the hash of the file; or receiving the hash of the file from the sending apparatus.

The apparatus may be configured to obtain the hash of the file from the second apparatus by one or more of: receiving the file from the second apparatus, and hashing the file to obtain the hash of the file; or receiving the hash of the file from the second apparatus.

The apparatus may be configured to obtain the hash of the file from the second apparatus in response to a request from the second apparatus following receipt of the file by the second apparatus from the sending apparatus.

The identifier associated with the file creator may be retrieved from one or more of: storage at the apparatus; or cloud storage.

The file may comprise a human-readable portion and a machine-readable portion. The hash of the file may be: a hash of the machine-readable portion of the file; a hash of the human-readable portion of the file; or a hash of both the machine-readable portion and the human-readable portion of the file. The file may be one or more of a Portable File Format A (PDF/A) file, a Microsoft Office file; and an Apache OpenOffice file. The file may contain one or more of embedded JavaScript Object Notation (JSON) content, and embedded eXtensible Mark-Up Language (XML) content.

The immutable ledger may be a blockchain ledger, or a ledger with blockchain-like capabilities, such as recordal of cryptographically chained transactions, amendments, additions and/or deletions.

The apparatus may be configured to:
determine that the second apparatus has an associated identifier stored at the apparatus;
provide a pairing invitation to the file creator to create a pairing link with the second apparatus;
receive an approval indication from the file creator to create the pairing link with the second apparatus; and
create the pairing link between the file creator and the second apparatus, the pairing link configured to permit file transmission between the file creator and the second apparatus.

One of the one or more assertions may indicate:
the file has been received at the second computer;
the file has been transmitted from the second computer to a third computer;
a note has been recorded associated with the file,
content of a note recorded associated with the file;
a change of status related to the file; or
a cross-reference to another file recorded in the immutable ledger.

One or more further data items may be associated with the creator of the hashed file and stored in the immutable ledger. The one or more further data items may comprise a time of creation of the file; a location identifier indication where the file was created; a file creator profile, one or more file creator assertions; and one or more file assertions. The apparatus may be configured to transmit, to the second apparatus, at least one of the one or more further data items associated with the hashed file.

In an aspect there is provided a computer-implemented method of verifying an origin of a transmitted file, comprising: obtaining a hash of a file to be transmitted to a second apparatus and an indication of a file creator of the file; retrieving an identifier associated with the file creator; storing the hash of the file, associated with the identifier of the file creator, in an immutable ledger; obtaining the hash of the file from the second apparatus; verifying that the hash of the file is stored in the immutable ledger; retrieving, from the immutable ledger, one or more assertions r associated with the file; retrieving, from the immutable ledger, the associated identifier of the file creator using the hash of the file; and transmitting, to the second apparatus: a confirmation that the file is from the file creator; and at least one of the one or more assertions associated with the file.

In an aspect there is provided computer software including instructions which, when executed by a computer, cause the computer to perform any method claimed herein. The computer software may be stored on a non-transitory computer-readable medium. Any computer software or computer program code described herein may be a sub-program configured to operate with one or more further computer programs.

In an aspect there is provided a computer comprising any apparatus as disclosed herein, or arranged to perform any method as disclosed herein. Such a computer may be one or more of: a desktop computer, a laptop computer, a tablet computer, a portable electronic device, a mobile telephone, a smartwatch, a computing device in a vehicle, or a module for the same.

In an aspect there is provided a system comprising any apparatus as disclosed herein, and an immutable ledger in communication with the apparatus.

In an aspect here is provided a data processing system or computer program product for use in any apparatus disclosed herein.

In an aspect there is provided a computer comprising any system described herein, arranged to perform any method described herein, or arranged to execute any computer program code described herein.

In an aspect there is provided a data processing system or computer program product for use in any system described herein.

The term "computer" may be understood to encompass a single computing entity/device or a distributed computer system comprising a plurality of computing entities/devices which may be located at substantially the same geographic location, or at substantially different geographical locations. One or more computing entities/devices in a distributed system may be located in the "computing cloud".

BRIEF DESCRIPTION OF THE DRAWINGS

Embodiments will now be described by way of example only, with reference to the accompanying figures, in which.

DETAILED DESCRIPTION

Examples disclosed herein may provide means for secure verification of a sender of an electronic file. Examples disclosed herein may provide means for secure addition or linking of further data to a file in a way which is immutably linked to the true data provider.

For example, apparatus as disclosed herein may allow verification of an origin of a transmitted file, by: obtaining a hash of a file to be transmitted to a second apparatus and an indication of a file creator of the file; retrieving an identifier associated with the file creator; storing the hash of the file, associated with the identifier of the file creator, in an immutable ledger; obtaining the hash of the file from the second apparatus; verifying that the hash of the file is stored in the immutable ledger; retrieving, from the immutable ledger, one or more assertions associated with the file; retrieving, from the immutable ledger, the associated identifier of the file creator using the hash of the file; and transmitting, to the second apparatus: a confirmation that the file is from the file creator; and at least one of the one or more assertions associated with the file.

Such apparatus may, thereby, provide proof of the provenance of a file (i.e. who created the file), the existence of the file (i.e. that it existed at the point in time it was recorded in an immutable ledger), integrity of the file (i.e. that its content wasn't tampered by any rogue actor), or one or more assertions recorded against the file by the creator, recipient, or authorised third party. In some examples, such apparatus may be able to provide proof of the integrity of the file and creator without knowing the content of a file. For example, the file may contain confidential information.

The terms "file", "document", "electronic document" may be used interchangeably, unless the context suggests otherwise, to mean an electronic data item. The terms "ledger apparatus" and "apparatus" may also be used interchangeably. The terms "recipient apparatus" and "second apparatus" may also be used interchangeably.

Figure 1:
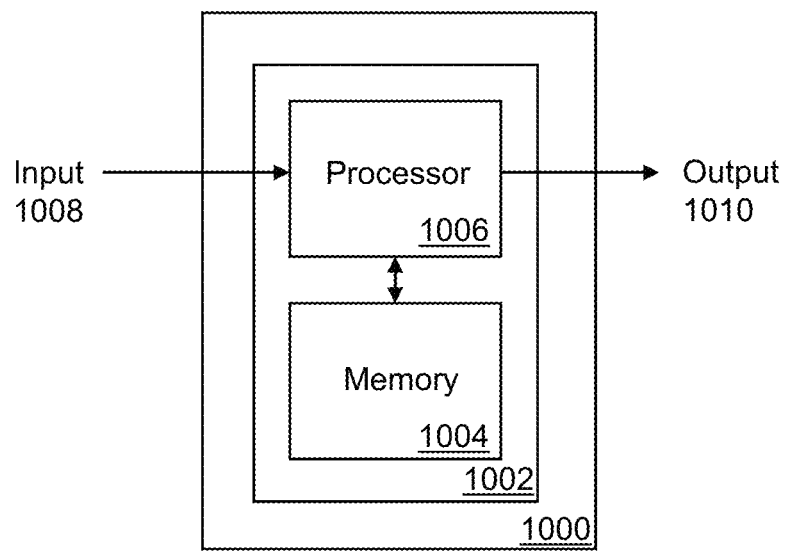
FIG. 1 shows an example apparatus according to an embodiment.

FIG. 1 shows an apparatus 1000 according to an embodiment. The apparatus 1000 may be the apparatus for verifying an original of a transmitted file, a computing apparatus operated by the file sender, a second apparatus operated by the file recipient, or may form a part of any of the apparatus for verifying an original of a transmitted file, a file sender apparatus, or a file recipient second apparatus. Any of the apparatus for verifying an original of a transmitted file, a file sender apparatus, or a file recipient second apparatus, may comprise a plurality of apparatus 1000 as illustrated.

The apparatus 1000 may comprise one or more processing units 1002 (one is shown in FIG. 1). Each processing unit comprises a memory 1004 and processor 1006. The apparatus 1000 may comprise one or more processors 1006 arranged to operably execute computer software/computer program code thereon, where the computer software/computer program code is stored in a computer-readable medium accessible to the one or more processors 1006. The computer-readable medium may be one or more memory devices, where the memory may also store data for use by the software/program code (e.g. memory 1004 or a separate memory store external to the apparatus 1000). It will be appreciated that the memory 1004 in which, for example, a creator ID, file hash, timestamp of file storage in an immutable ledger, creator assertions and/or recipient assertions may be stored, may in some examples be part of a physically distinct computer system than the one or more computers implementing the processing, such as creating a file hash, transmitting requests to the immutable ledger, receiving information from the immutable ledger or from a recipient second apparatus.

The apparatus 1000 can receive data (e.g. a file or file hash from a sender, a file or file hash from a second apparatus, data from the immutable ledger) as input 1008 and can provide data (e.g. a file hash to the immutable ledger, a query to the immutable ledger, a confirmation of file origin and/or assertions to the second apparatus) as output 1010.

It will be appreciated that the one or more processors 1006 do not necessarily need to be formed as part of the same physical server apparatus 1000 and that at least a portion of the processors 1006 may form a virtual machine implementing the system 1000 i.e. as a cloud computer. Embodiments may be implemented by a plurality of distributed computers 1000, with each of the computers 1000 performing one or more processing steps.

Figure 2:
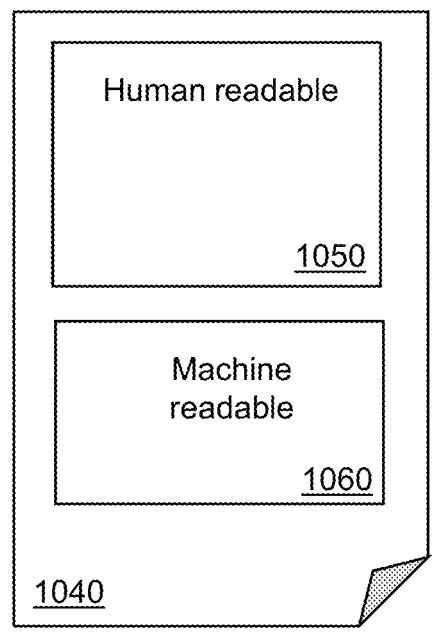
FIG. 2 shows an example file according to an embodiment.

FIG. 2 illustrates a file 1040 which may be considered an electronic file or electronic document. The file 1040 may be, for example, a Portable File Format A, PDF/A, file, a Microsoft Office file or an Apache OpenOffice file. The file 1040 comprises a human-readable file portion 1050 (such as a word processing document) and a machine-readable file portion 1060 (such as a data payload). The machine-readable portion may comprise embedded JavaScript Object Notation (JSON) content, and/or embedded eXtensible Mark-Up Language (XML) content, for example. A sending apparatus may wish to send the file 1040 to a second receiving apparatus. The second receiving apparatus may wish to check that the origin of the file 1040 is genuine (i.e. the sender is who they appear to be from the file). As part of example processes described herein providing ways to verify the origins of a file 1040, an apparatus such as apparatus 1000 may receive, or may create, a hash of the file 1040 transmitted to the second receiving apparatus. The hash of the file 1040 may be a hash of the machine-readable portion 1060 of the file 1040; a hash of the human-readable portion 1050 of the file 1040; or a hash of both the machine-readable portion 1060 and the human-readable portion 1050 of the file 1040. The hash may be calculated over a canonicalized representation of at least a portion of the file.

Figure 3:
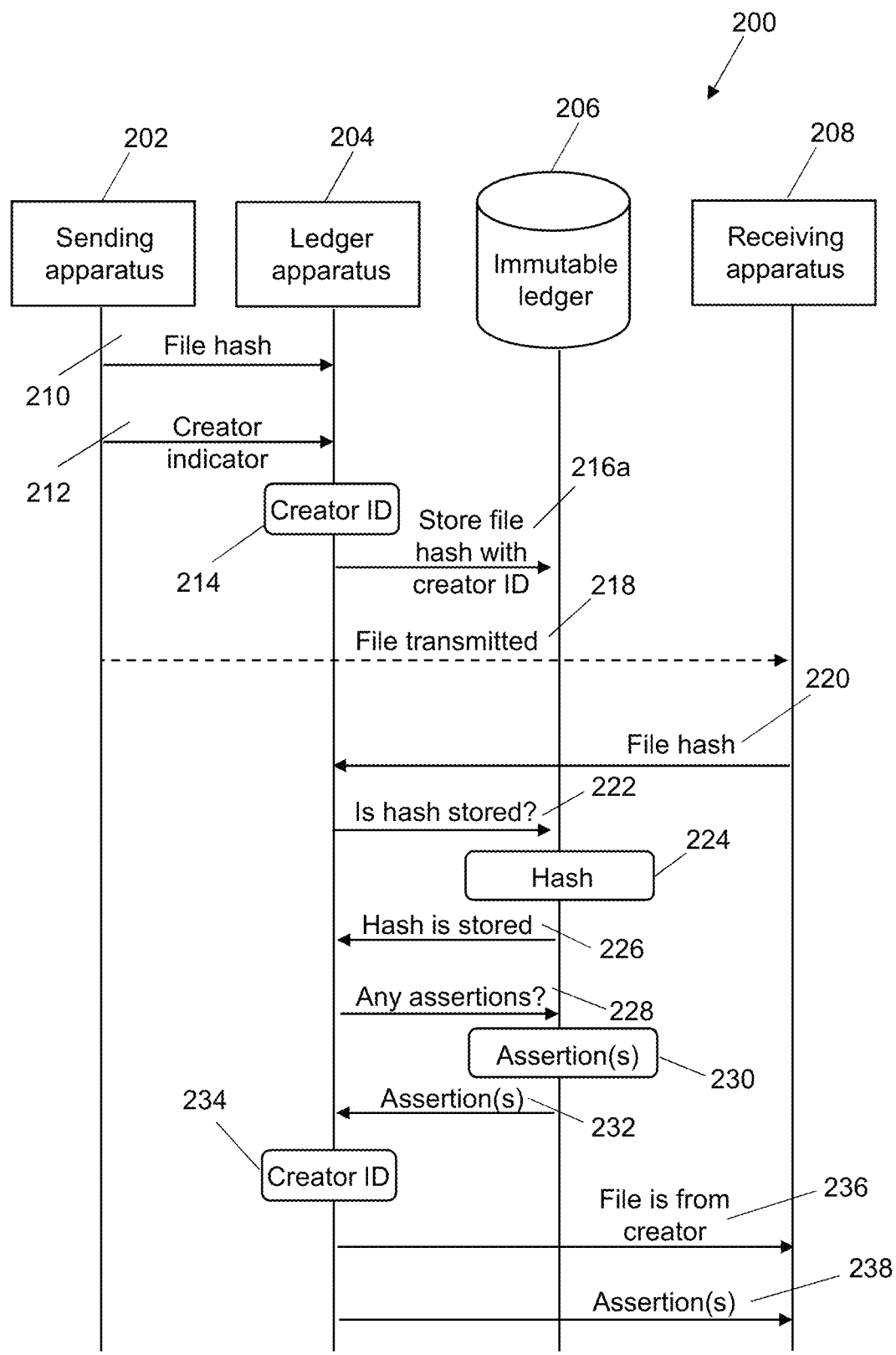
FIG. 3 shows an example system and data flow according to an embodiment.

FIG. 3 shows an example system 200 comprising a sending apparatus 202 (e.g. an application or domain service), ledger apparatus 204, an immutable ledger 206, and a receiving apparatus 208 (which may be termed a second apparatus 208).

The ledger apparatus 204 is configured to verify an origin of a transmitted file. The ledger apparatus 204 first obtains a hash of a file 210 to be transmitted to a second apparatus 208, and obtains and an indication of a creator 212 of the hashed file. In this example, the apparatus 204 obtains the hash of the file 210 to be transmitted to the second apparatus 208 by receiving the hash of the file from the sending apparatus 208 (i.e. the sending apparatus 208 has hashed the file).

The ledger apparatus 204 retrieves an identifier 214 ("Creator ID") associated with the file creator. The identifier associated with the file creator may be retrieved from, for example, storage at the apparatus 204, accessible by the apparatus 204, or at cloud storage. The hash of the file 210 may be cryptographically associated with the identifier of the file creator 214. The ledger apparatus 204 then stores 216a the hash of the file 210 associated with the identifier of the file creator 214, in an immutable ledger 206. The immutable ledger 206 may be based on a blockchain in some examples. For added security the stored hashed file may be cryptographically signed by the apparatus 204, for example with a generic X.509 signature, indicating a certificate of the apparatus 204 as a verified source. X.509 is a standard defining the format of a public key certificate, and may be used as an electronic signature.

In examples where the file comprises a canonicalized JSON document portion, the JSON document portion may be rendered from another representation "on the fly" (for instance from data stored in a relational database). Thus JSON may provide a more flexible file type than other files which comprise a more permanent structure. To help ensure the integrity of a file comprising a PDF portion with an embedded JSON portion (that is, to help ensure that the human readable part 1050 of a PDF file says the same as the machine readable JSON part 1060 of the file), the hash of the non-JSON part of the file may be included in the JSON file. Another approach may be to store two hashes in the immutable ledger 206. In examples where a "double" hash (or double digest) is recorded in the immutable ledger 206, a first hash may be calculated over the machine readable portion (e.g. the canonicalized JSON portion) of the file and thereby create a fingerprint of the file, and a second hash may be produced by the immutable ledger 206, thereby making the file fingerprint immutable and cryptographically verifiable (i.e. the fingerprint rather than the document behind the fingerprint). Doing so may increase the security of the file (i.e. reduce the possibility of tampering with the file).

In some examples, a hash of a machine-readable part of the file is recorded in the immutable ledger 206, possibly with additional information such as who created it and/or the file type. The file itself (e.g. including a human-readable portion) or details of the content of the file may not necessarily be recorded in the immutable ledger 206 in some examples. By recording the hash in the immutable ledger 206, a given file can be verified by recalculating the hash and checking the immutable ledger for a record with a corresponding hash. The file content need never be exposed to the ledger apparatus, because the recipient/second device 208 can do the hash calculation prior to sending the hash to the ledger apparatus 204 to request verification of the identity of the file sender.

The ledger apparatus 204 may issue a unique member ID/creator ID 214 for each network member (i.e. for the sending apparatus 202 and the receiving apparatus 208). The member ID 214 issued by the ledger apparatus 204 may be immutable. Thus, the ledger apparatus 204 may guarantee the 'parentage' of a file by using the immutable ID 214 for the file sender.

The sending apparatus 202 may then send the file 218, of which the hash is transmitted 210 to the ledger apparatus 204, to a second receiving apparatus 208. The receiving apparatus 208 may wish to know that the file purporting to be from the sender 202 is actually from the sender 202, and not, for example, a fraudulent document or a file from a spoofed address.

The ledger apparatus 204 obtains the hash of the file 220 from the second receiving apparatus 208, in this example by receiving the hash of the file from the second apparatus (i.e. the second apparatus 208 has hashed the file prior to sending it to the apparatus 204). The apparatus 204 may be configured to obtain the hash of the file 220 from the second apparatus 208 in response to a request from the second apparatus 208 (not shown) following receipt of the file 218 by the second apparatus 208 from the sending apparatus 202.

The receiving apparatus 208 may transmit a request the ledger apparatus 204 to verify that the received file is actually from the sender indicated as the sender of the file. The ledger apparatus 204 verifies that the hash of the file 224 is stored in the immutable ledger 206, for example by the apparatus 204 querying 222 the immutable ledger 206 and, following the immutable ledger 206 identifying that the hash 224 of the file is stored at the immutable ledger 206, receiving an indication 226 from the immutable ledger 206 that the hash 224 is recorded thereon. By verifying that the hash of the file 210, which is associated with the creator indicator 212, is stored in the immutable ledger 210, matches the hash of the file 220 obtained from the receiving apparatus 208, it can be said that the file received 218 at the receiving apparatus 208 is indeed from the creator having the creator ID 214. Because the storage of the file hash 216a at the immutable ledger 206 cannot be tampered with or overwritten by virtue of the immutability (non-changing, or fixed, nature) of the data storage in the immutable ledger, a secure way of proving the creator origin of a file is provided.

The ledger apparatus 204 then retrieves one or more assertions 230 recorded in the immutable ledger 206 and associated with the hashed file, from the immutable ledger 206. At least one of the one or more assertions 230 may be cryptographically associated with the hashed file. For example, the apparatus 204 may query 228 the immutable ledger 206 and, following the immutable ledger 206 identifying that one or more assertions 230 are stored at the immutable ledger 206, receiving an indication 232 from the immutable ledger 206 that the assertion(s) 230 are recorded thereon. The one or more assertions may indicate, for example, that: the file has been received at the second computer; the file has been transmitted from the second computer to a third computer; a note has been recorded associated with the file; content of a note recorded associated with the file; a change of status related to the file (for example, that ownership of the file has been transferred, that an action indicated by the file has been carried out, or another material change has taken place); or a cross-reference to another file recorded in the immutable ledger.

The ledger apparatus 204 retrieves the stored associated identifier 234 of the file creator using the hash of the file. The ledger apparatus 204 then transmits, to the second apparatus 208, a confirmation that the file is from the file creator 236, and at least one of the one or more assertions 238 associated with the hashed file. In some examples, the apparatus 204 may transmit, to the second apparatus 208, profile information about the file creator.

The data recorded by the ledger apparatus 204 may be according to a 'need to know' principle. For example, the content of a file may not necessarily be recorded at the ledger apparatus 204, and only the hash may be recorded (only the hash of the file may ever be received by the ledger apparatus 204 if both the sender apparatus 202 initially sends a hashed file, and the recipient apparatus 208 sends the hashed file as well. This may reduce the transmission (and therefore the risk of unauthorised interception) of sensitive file data. The ledger apparatus 204 may not record to whom a file was sent in some examples. The recipient apparatus may record that they are the recipient through storage of an assertion at the immutable ledger 206.

Assertions may be used to allow the assertion recording apparatus (e.g. sending apparatus 202 or receiving apparatus 208) to control how much additional information to disclose in association with the file (or file hash). Third party apparatus may also, in some examples, be permitted to record assertions against a file or file hash. The third party may be authorised to record assertions if the file creator indicates the third party is permitted to do so. Such assertions may be available to access by any apparatus having a valid copy of the file (i.e. they are permitted to possess or access the file).

Figure 4:
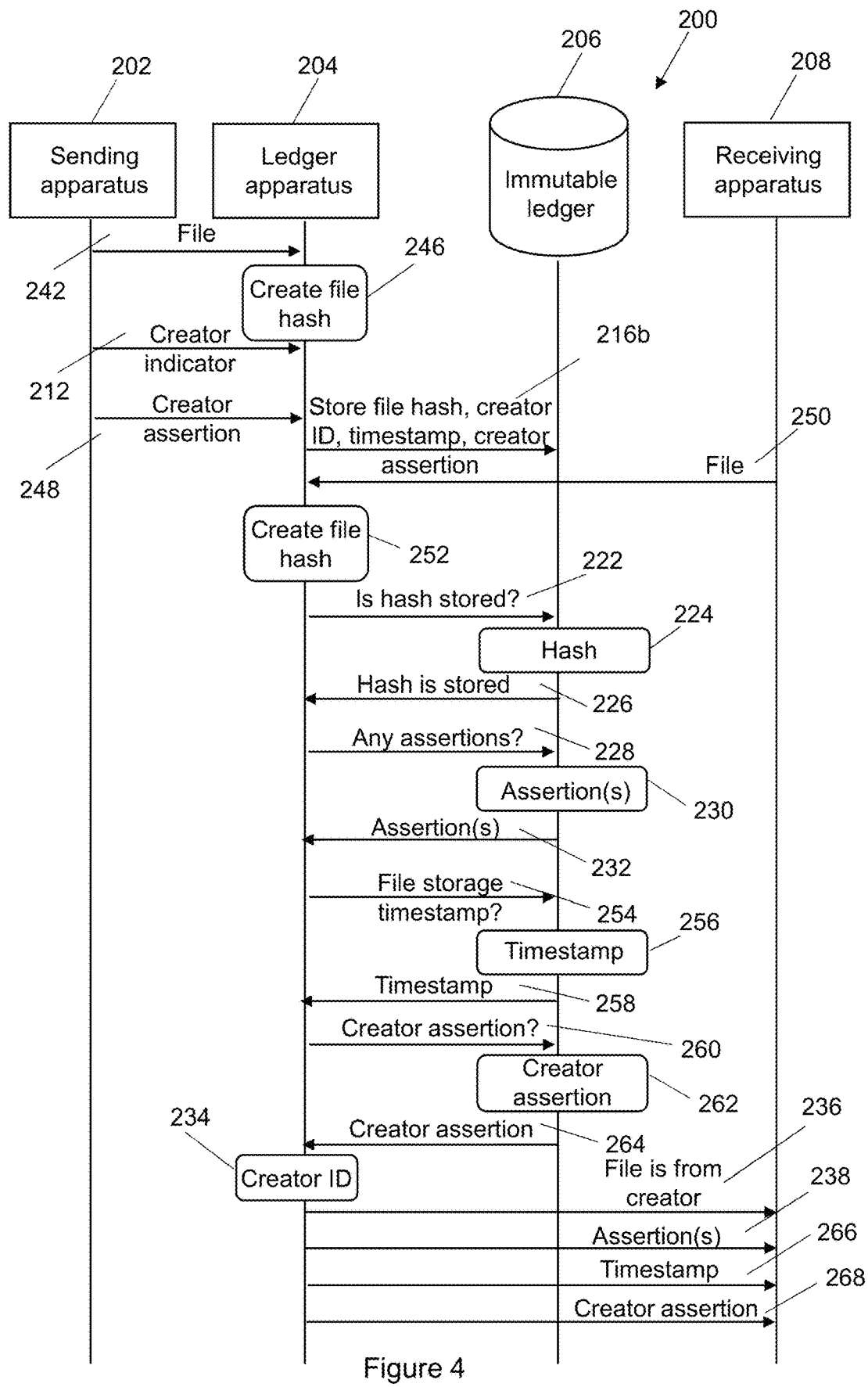
FIG. 4 shows an example system and data flow according to an embodiment.

FIG. 4 shows an example system 200 comprising a sending apparatus 202, ledger apparatus 204, an immutable ledger 206, and a receiving apparatus 208. Features in common with the system of FIG. 3 will not be discussed in detail again. One or more of the features of FIG. 4 additional to those of FIG. 3 may be included in an example system 200 in isolation without requiring the one or more other features of FIG. 4 not included in FIG. 3.

The ledger apparatus 204 is configured to verify an origin of a transmitted file. The ledger apparatus 204 first obtains a hash of a file 246 to be transmitted to a second apparatus 208. In this example, the apparatus 204 obtains the hash of the file 246 to be transmitted to the second apparatus 208 by receiving the file 242 to be transmitted from the sending apparatus 202, and hashing the file 246 to obtain the hash of the file. The ledger apparatus 204 also obtains an indication of a creator ("creator ID") 212 of the file, and obtains one or more file creator assertions 248 associated with the file creator, from the sender apparatus 202.

The ledger apparatus 204 then stores 216b the hash of the file 246 associated with the identifier 212 of the file creator 214, the creator indication/ID 212, one or more creator assertions 248, and a timestamp indicating when the file hash 246 was originally recorded in the immutable ledger 206, at the immutable ledger 206. In other examples the apparatus may store only one or more of the one or more creator assertions 248, and the timestamp indicating when the file hash 246 was originally recorded in the immutable ledger 206 at the immutable ledger 206.

Following transmission of a file (i.e. of which the hash is stored at the immutable ledger 216b) to the receiving apparatus 208 (not shown here), the receiving apparatus 208 may wish to know that the file purporting to be from the sender 202 is actually from the sender 202.

In this example, the receiving apparatus 208 transmits the received file 250 to the ledger apparatus 204 for verification. The ledger apparatus 204 obtains the hash of the file 252 from the second receiving apparatus 208 (in this example by receiving the file 250 from the second apparatus 208, and hashing the file 252 to obtain the hash of the file).

The ledger apparatus 204 verifies that the hash of the file 224 is stored in the immutable ledger 206 as described in relation to FIG. 3. The ledger apparatus 204 may also then retrieves one or more assertions 230 recorded in the immutable ledger 206 and associated with the hashed file, for example by querying 228 the immutable ledger 206 and, following the immutable ledger 206 identifying that one or more assertions 230 are stored at the immutable ledger 206, receiving an indication 232 from the immutable ledger 206 that the assertion(s) 230 are recorded thereon. These assertion(s) 230 may be recorded by the receiving apparatus 208, or by a third party, against the hashed file 224 at the immutable ledger 206, for example indicating that an action relating to the hashed file has been performed (and therefore does not need to be performed again), such as a software update.

The apparatus 204 in this example is also configured to retrieve a timestamp 256 indicating when the file hash 224 was originally recorded 216b in the immutable ledger 206 from the immutable ledger 206. For example, the apparatus 204 may query 254 the immutable ledger 206 for a timestamp 256 indicating when the hash file was stored 216b at the immutable ledger 206. Following the immutable ledger 206 identifying that a timestamp 256 is stored at the immutable ledger 206, the apparatus 204 may receive the timestamp 258 from the immutable ledger 206. The apparatus 204 may later transmit 266 the retrieved timestamp 256 to the second apparatus 208.

The apparatus 204 in this example is also configured to retrieve one or more assertions 262 associated with the file creator which are recorded in the immutable ledger 206, from the immutable ledger 206. For example, the apparatus 204 may query 260 the immutable ledger 206 for any creator assertions 262 stored at the immutable ledger 206 associated with the creator of the hashed file 252. Following the immutable ledger 206 identifying that one or more creator assertions 262 are stored at the immutable ledger 206, the apparatus 204 may receive at least one of the one or more creator assertions 264 from the immutable ledger 206. The apparatus 204 may later transmit 266 an indication of the one or more assertions 268 associated with the file creator to the second apparatus 208. The one or more assertions 262 associated with the file creator may indicate a security level of the file creator, for example, so the receiving device 208 is provided with an indication of how safe the file from the creator is to open and/or process (that is, how trustworthy the sender of the file is). The creator assertions 268 may be amended or added to in the immutable ledger 206 as additional assertion data becomes available about the file creator.

The ledger apparatus 204 facilitates the transmission of files in a way which allows the recipient to verify the sender. Since assurances may be recorded against the file over time, and such assurances are recorded in the immutable ledger, a security or "trust" profile may be formed of the sender which may change over time. For example, assurances indicating positive or safe actions taken by the sender may act to increase the security profile of the sender, and conversely, assurances indicating unsafe or unexpected/untrustworthy actions taken by the sender may act to decrease the security profile of the sender. Thus the security profile of the sender may dynamically vary as assurances are recorded against files transmitted by that sender and/or by assurances recorded against the sender. In this way, assertions may be considered a mechanism by which computing entities can "comment" on something (e.g. a file, sender, third party).

Alongside the provision of a timestamp 266 and creator assertion data 268, the ledger apparatus 204 in this example also provide a confirmation that the file is from the file creator 236, and at least one of the one or more assertions 230 (e.g. recorded by the recipient or a third party) associated with the hashed file. These provisions to the receiving apparatus 208 are performed after the ledger apparatus 204 has retrieved the stored associated identifier 234 of the file creator using the hash of the file 252.

Figure 5:
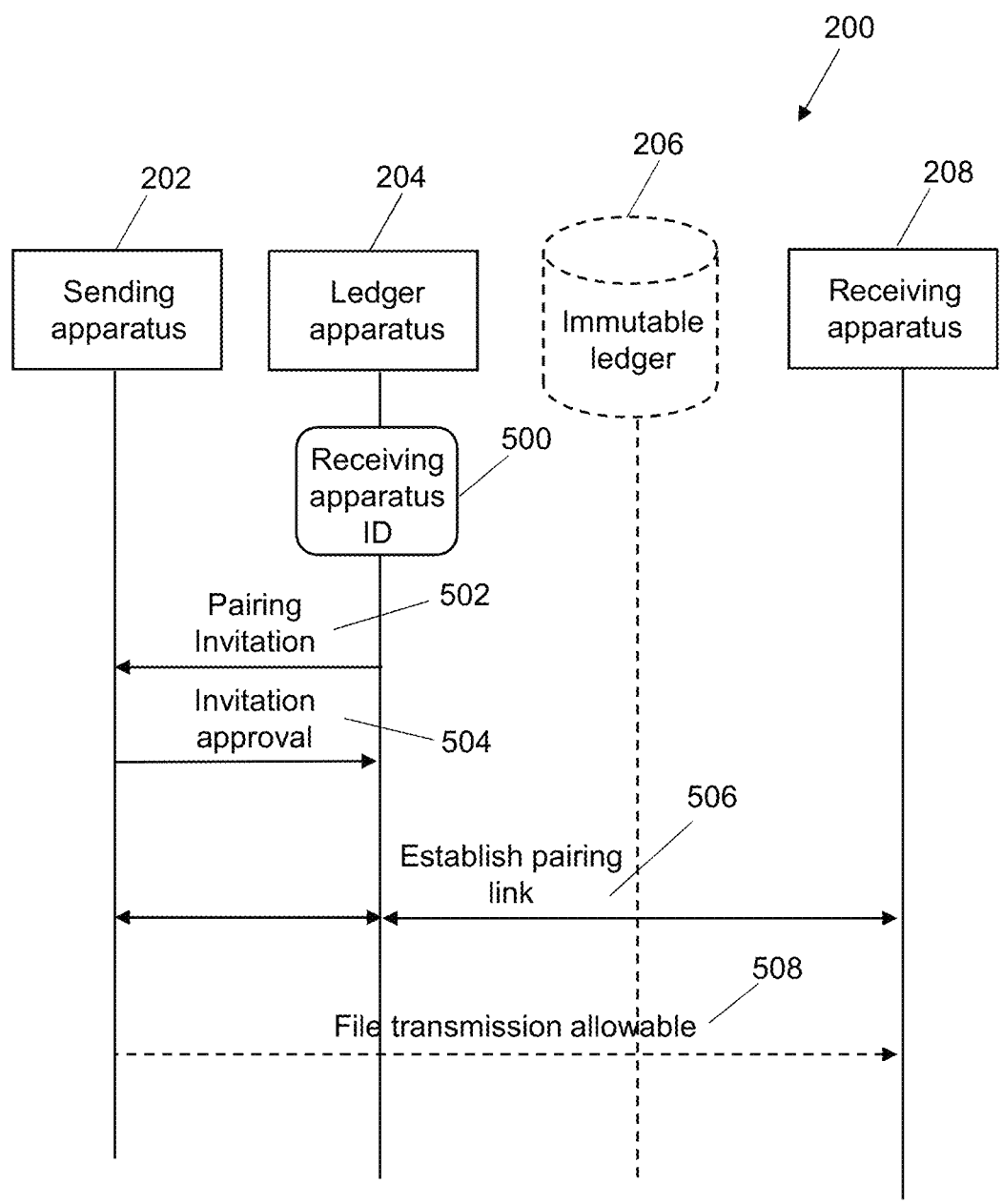
FIG. 5 shows an example system and data flow according to an embodiment.

FIG. 5 shows an example system 200 and illustrates that a sending apparatus 202 and receiving apparatus 208 may be paired. Paired apparatuses 202, 208 may permit file transmission directly from one to the other apparatus 202, 208 through a shared software platform or application. The shared software or platform may be associated with the ledger apparatus and may be registered as a verified or secure platform through which files may be transmitted and verified using the ledger apparatus 204. Apparatuses which are not paired may still be used, but in such cases, files may be transmitted through email or filesharing, for example.

In FIG. 5, the apparatus 204 is configured to determine that the second apparatus 208 has an associated identifier 500 stored at the apparatus 204. The associated identifier 500 may be termed a receiving apparatus ID 500, or apparatus ID 500. The apparatus 204 provides a pairing invitation 502 to the file creator (e.g. at the sending apparatus 202) to create a pairing link with the second apparatus 208. If the sending apparatus 202/creator approves the pairing request 502, then a pairing approval message/invitation approval message 504 is received at the apparatus 204 from the sending apparatus 202/creator. That is, the apparatus 204 receives an approval indication 504 from the file creator 202 to create the pairing link with the second apparatus 208. The apparatus 204 then can create the pairing link 506 between the file creator 202 and the second apparatus 208. The pairing link 506 is configured to permit file transmission 508 between the file creator 202 and the second receiver apparatus 208.

That is, pairing allows two parties to directly exchange files/documents without using a public messaging service like email. Pairing may be initiated by the recipient of a document for a given sender identity. First, it may be determined whether the sender has a recorded sender ID at the apparatus 204. Then the pairing request may be confirmed with the sender. The pairing request can itself be a file recorded on the ledger apparatus 204, with the confirmation stored as a document assertion, for example. In some examples, a sender may be required to provide a recipient reference, and the recipient requesting pairing may be required to provide a sender reference.

Once the pairing is completed, the sender may directly transmit files through the pairing connection instead of using a public messaging service. The recipient knows where the document came from, and how it correlates internally, because the sender and the transmission connection are formed through the ledger apparatus. While individual file (file hashes) may still be recorded in the immutable ledger, it is no longer necessary for the recipient apparatus to verify every single document received through the pairing connection. Both parties in the pairing connection may be able to revoke a pairing arrangement. It may also be possible to revoke all paring agreements for a given identity at once.

Figure 6:
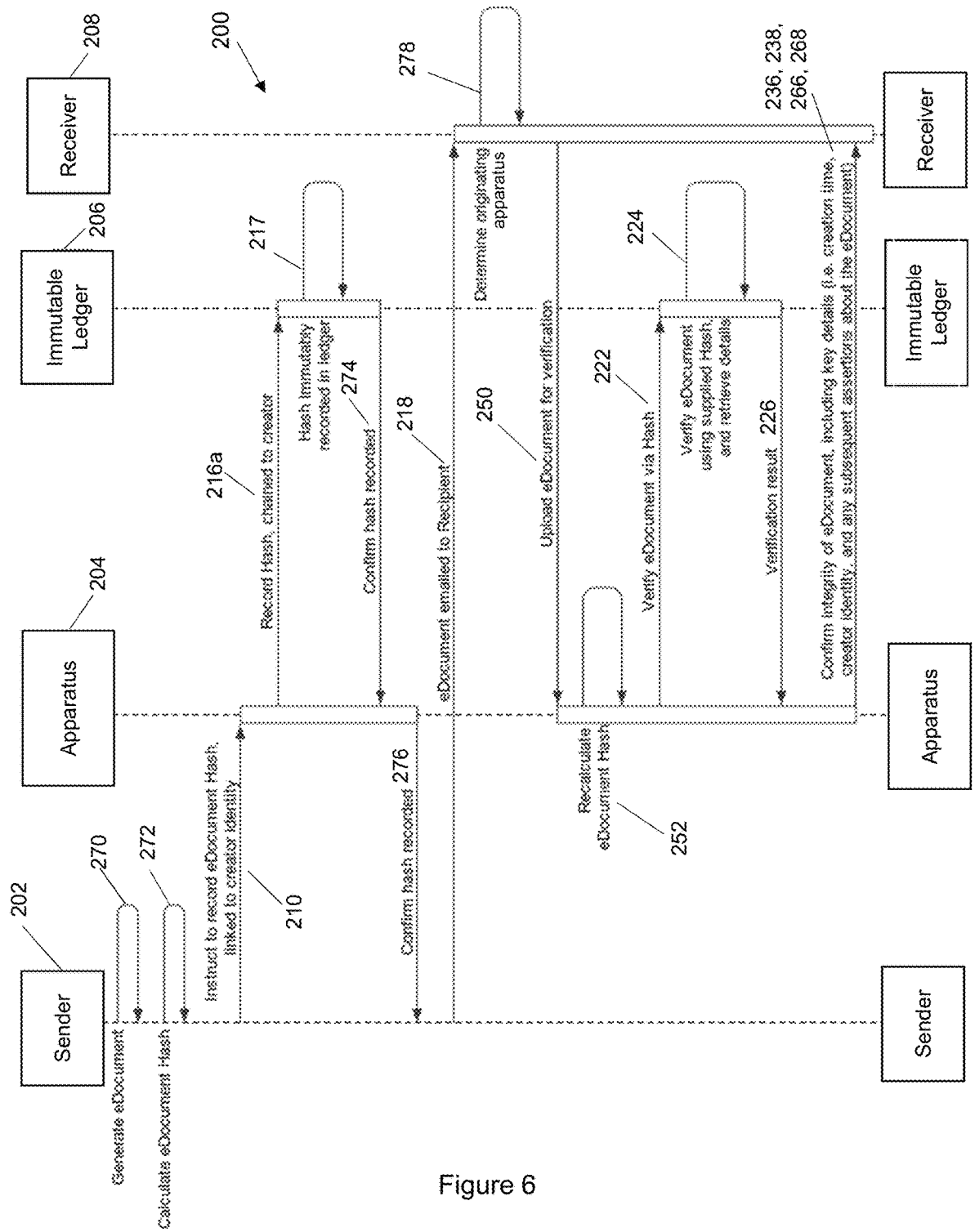
FIG. 6 shows an example system and data flow according to an embodiment.

FIG. 6 illustrates an example system 200 comprising a sending apparatus 202, ledger apparatus 204, an immutable ledger 206, and a receiving apparatus 208 (which may be termed a second apparatus 208). Features in common with FIGS. 3 and 4 will not be discussed again in detail here.

FIG. 6 illustrates the sender 202 generating an eDocument file 270 to be transmitted and sending it as an email 218 to a recipient 208. An eDocument is an example type of file illustrated in FIGS. 6 and 7, but it could be any type of file which is transmitted.

The sender 202 in this example also hashes 272 the eDocument 270 before instructing the apparatus 204 to record the eDocument hash 210, which is linked to the creator ID of the eDocument creator.

Following transmission 216a and immutable recordal 217 of the hash (linked/chained to the creator) 216a in the immutable ledger 206, the immutable ledger 206 provides a confirmation 274 to the apparatus 204 that the hash has been successfully recorded in the immutable ledger 206. The apparatus 204 in this example then confirms 276 the hash recordal 217 in the immutable ledger 206 to the sender apparatus 202.

Following transmission 218 of the eDocument to the recipient apparatus 208, the receiver wishes to check 278 the originating sender 202 to check they are who they say they are. This is performed as described in the above example of FIG. 4. The apparatus 204, once the sender of the eDocument has been verified using the supplied hash 226, retrieves the details of the sender from the immutable ledger 206 and provides a verification to the receiving apparatus that the sender of the eDocument is who they purport to be. In this example, the verification comprises key details such as the time of eDocument creation 266, the creator identity 236 (or an indicator that the creator identity is as expected), and assertions 238, 268 recorded against the eDocument in the immutable ledger (creator assertions 268, recipient assertions 238 and/or third party assertions).

Figure 7:
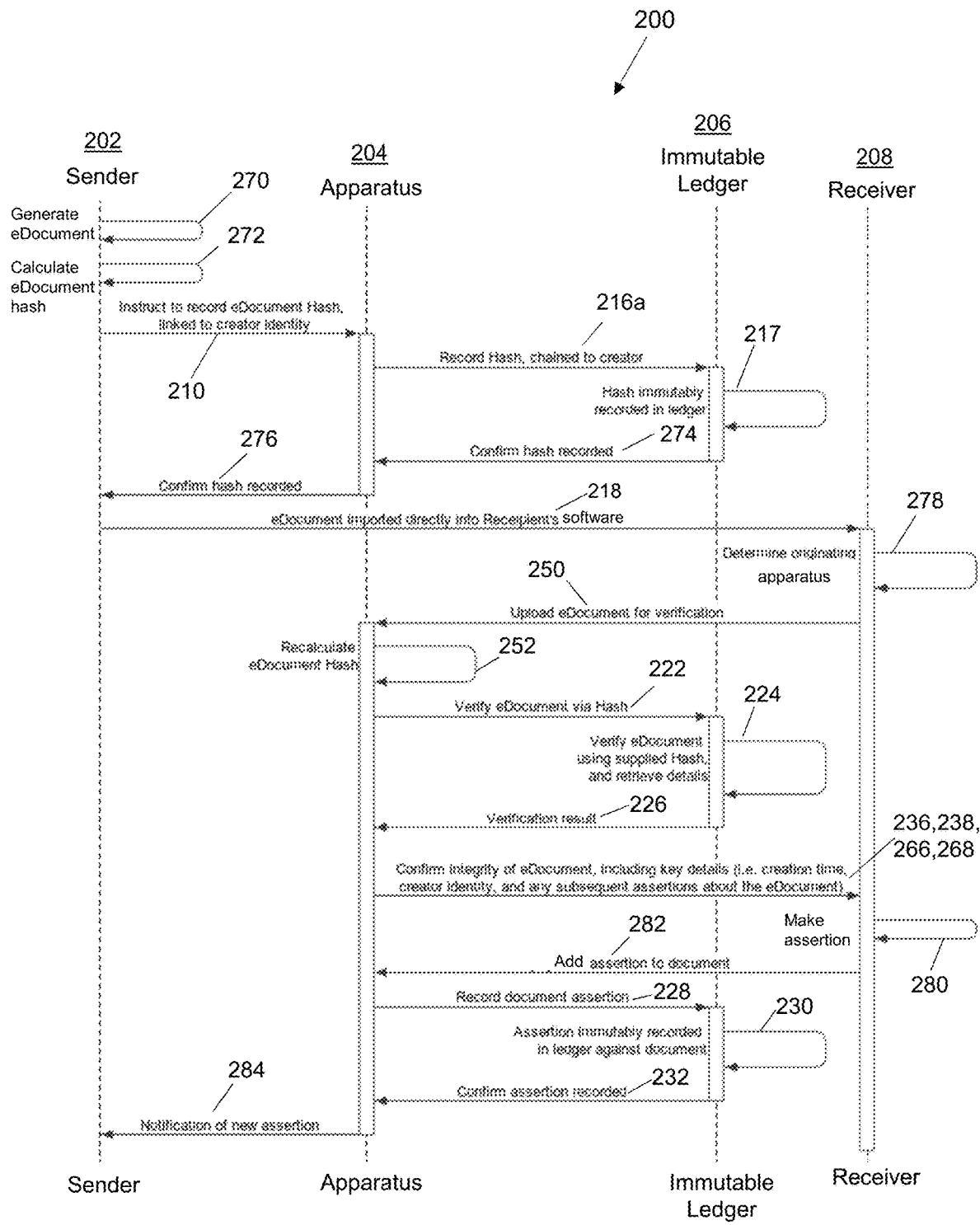
FIG. 7 shows an example system and data flow according to an embodiment.

FIG. 7 illustrates an example system 200 comprising a sending apparatus 202, ledger apparatus 204, an immutable ledger 206, and a receiving apparatus 208 (which may be termed a second apparatus 208). Features in common with FIG. 6 (and FIGS. 3 and 4) will not be discussed again in detail here.

Compared with FIG. 6, the system of FIG. 7 illustrates the sender 202 generating an eDocument file 270 to be imported directly into a recipient's software 208. This may occur if the sender 202 and receiver 208 are previously paired as discussed in relation to FIG. 5.

Following export 218 of the eDocument from the sender's software and import to the recipient apparatus' software 208, the receiver wishes to check 278 the originating sender 202 to check they are who they say they are. This is performed as described in the above examples of FIGS. 3, 4 and 6, and in addition, FIG. 7 illustrates the making 280 and adding 282 of an assertion by the recipient apparatus 208. Following receipt of the confirmation that the identity of the eDocument sender 202 is as expected, the recipient apparatus 208 makes as assertion 280 against the eDocument. For example, the received file may be a software update, and the assertion may be a note that the received file software update has been implemented at the receiver apparatus. As another example, the received file may be a communication from a third party requesting action, and the assertion may be that the action has been taken. Such assertions may be made to verify as action has been taken, to help avoid unnecessary repeat of the same action being taken.

Once the assertion has been made 280, it is added 282 to the document by recording the assertion, linked to the document, at the apparatus 204. The apparatus 204 transmits the document assertion 228 to the immutable ledger 206 for recordal, which is then recorded 230 by the immutable ledger 206 against the document. Confirmation of the recordal 232 may then be sent from the immutable ledger 206 to the apparatus 204, and in turn the apparatus 204 may transmit a notification 284 of a new assertion being recorded against the document to the document sender 202.

Figure 8:
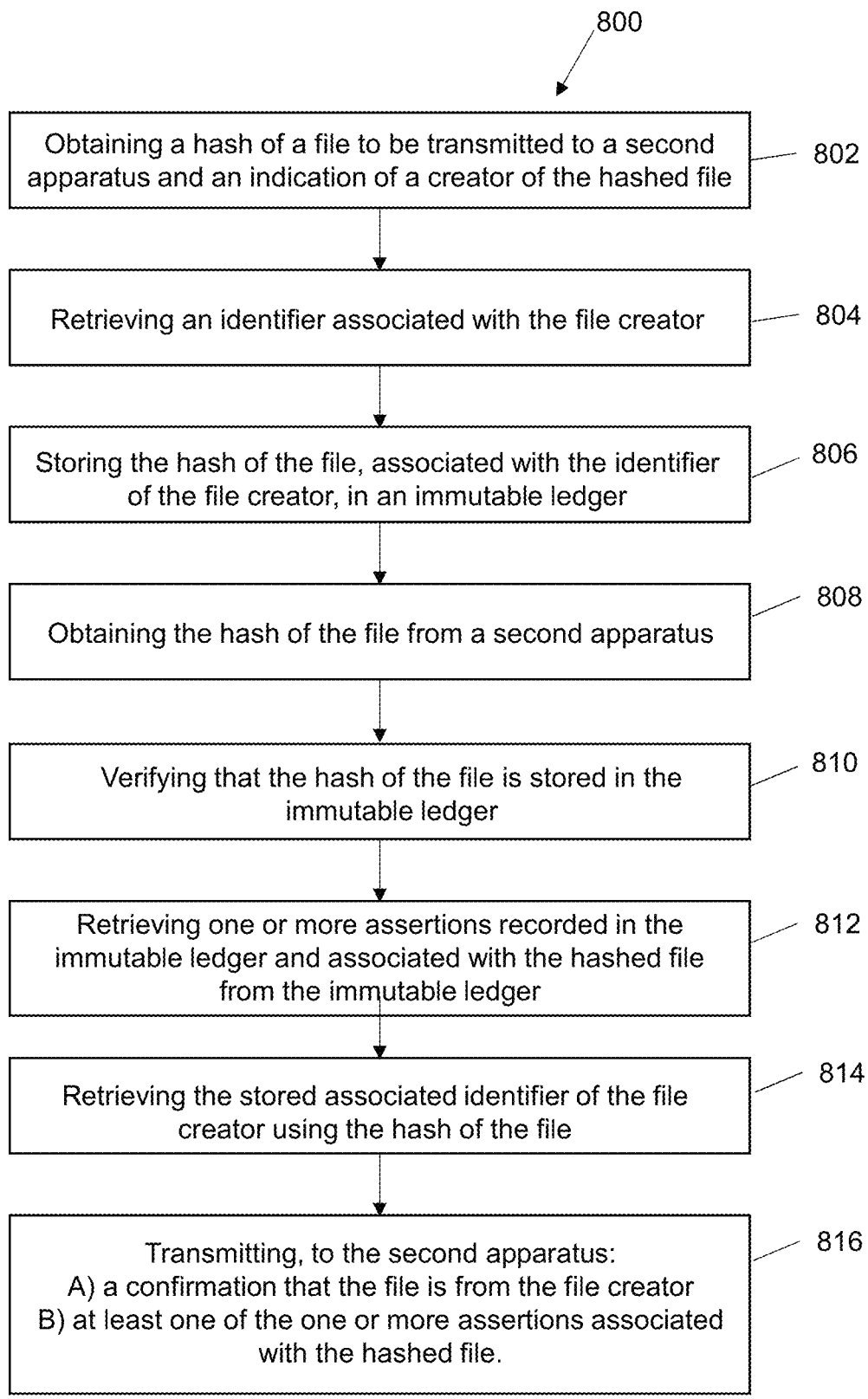
FIG. 8 shows a method according to an embodiment.

FIG. 8 shows a method 800 according to an embodiment. The method 800 comprises: obtaining a hash of a file to be transmitted to a second apparatus and an indication of a creator of the hashed file 802; retrieving an identifier associated with the file creator 804; storing the hash of the file, associated with the identifier of the file creator, in an immutable ledger 806; obtaining the hash of the file from a second apparatus 808; verifying that the hash of the file is stored in the immutable ledger 810; retrieving one or more assertions recorded in the immutable ledger and associated with the hashed file from the immutable ledger 812; retrieving the stored associated identifier of the file creator using the hash of the file 814; and transmitting 816, to the second apparatus: a confirmation that the file is from the file creator; and at least one of the one or more assertions associated with the hashed file. The method may be performed by a computer readable medium comprising computer program code/software which, when executed, is configured to perform the method. Such computer program code/software may be executed using an application program operating on a computing apparatus.

It will be appreciated that embodiments of the present invention can be realised in the form of hardware, software, or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as disclosed herein and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A ledger apparatus comprising a processor and a memory storing instructions that, when executed by the processor, are configured to cause the ledger apparatus to:

obtain a hash of a file to be transmitted from a sending apparatus to a receiving apparatus and an indication of a file creator of the file;

retrieve, from one of storage at the ledger apparatus or cloud storage, an immutable identifier associated with the file creator based on the indication of the file creator;

store the hash of the file, associated with the immutable identifier of the file creator and with one or more assertions provided by an authorized third party, in an immutable ledger;

obtain the hash of the file from the receiving apparatus;

verify that the hash of the file is stored in the immutable ledger;
retrieve, from the immutable ledger, at least one of the one or more assertions provided by the authorized third party and associated with the file;
retrieve, from the immutable ledger, the associated immutable identifier of the file creator using the hash of the file; and
transmit, to the receiving apparatus:
a confirmation that the file is from the file creator; and
the retrieved at least one of the one or more assertions provided by the authorized third party and associated with the file.

2. The ledger apparatus of claim 1, wherein the instructions, when executed by the processor, are further configured to cause the ledger apparatus to transmit, to the receiving apparatus, profile information about the file creator.

3. The ledger apparatus of claim 1, wherein the hash of the file is cryptographically associated with the immutable identifier of the file creator.

4. The ledger apparatus of claim 1, wherein the at least one of the one or more assertions provided by the authorized third party are cryptographically associated with the file.

5. The ledger apparatus of claim 1, wherein the instructions, when executed by the processor, are further configured to cause the ledger apparatus to:
retrieve, from the immutable ledger, a timestamp indicating when the hash was originally recorded in the immutable ledger; and
transmit the timestamp to the receiving apparatus.

6. The ledger apparatus of claim 1, wherein the instructions, when executed by the processor, are further configured to cause the ledger apparatus to store one or more file creator assertions associated with the file creator in the immutable ledger.

7. The ledger apparatus of claim 6, wherein the one or more file creator assertions associated with the file creator indicate a security level of the file creator.

8. The ledger apparatus of claim 1, wherein the instructions, when executed by the processor, are further configured to cause the ledger apparatus to:
retrieve one or more assertions recorded in the immutable ledger and associated with the file creator; and
transmit an indication of the one or more assertions associated with the file creator to the receiving apparatus.

9. The ledger apparatus of claim 1, wherein the instructions, when executed by the processor, are configured to cause the ledger apparatus to obtain the hash of the file to be transmitted to the receiving apparatus by one or more of:
receiving the file to be transmitted from the sending apparatus, and hashing the file to obtain the hash of the file; or
receiving the hash of the file from the sending apparatus.

10. The ledger apparatus of claim 1, wherein the instructions, when executed by the processor, are configured to cause the ledger apparatus to obtain the hash of the file from the receiving apparatus by one or more of:
receiving the file from the receiving apparatus, and hashing the file to obtain the hash of the file; or
receiving the hash of the file from the receiving apparatus.

11. The ledger apparatus of claim 1, wherein the instructions, when executed by the processor, are configured to cause the ledger apparatus to obtain the hash of the file from the receiving apparatus in response to a request from the receiving apparatus following receipt of the file by the receiving apparatus from the sending apparatus.

12. The ledger apparatus of claim 1, wherein the file comprises a human-readable portion and a machine-readable portion; and wherein the hash of the file is:
a hash of the machine-readable portion of the file;
a hash of the human-readable portion of the file; or
a hash of both the machine-readable portion and the human-readable portion of the file.

13. The ledger apparatus of claim 12, wherein the file is one or more of:
a Portable File Format A (PDF/A) file;
a Microsoft Office file; and
an Apache OpenOffice file.

14. The ledger apparatus of claim 12, wherein the file contains one or more of:
embedded JavaScript Object Notation (JSON) content; and
embedded extensible Mark-Up Language (XML) content.

15. The ledger apparatus of claim 1, wherein the immutable ledger is a blockchain ledger.

16. The ledger apparatus of claim 1, wherein the instructions, when executed by the processor, are further configured to cause the ledger apparatus to:
determine that the receiving apparatus has an associated identifier stored at the apparatus;
provide a pairing invitation to the sending apparatus to create a pairing link with the receiving apparatus;
receive an approval indication from the sending apparatus to create the pairing link with the receiving apparatus; and
create the pairing link between the sending apparatus and the receiving apparatus, the pairing link configured to permit file transmission between the sending apparatus and the receiving apparatus.

17. The ledger apparatus of claim 1, wherein the at least one of the one or more assertions indicates:
the file has been received at the receiving apparatus;
the file has been transmitted from the receiving apparatus to another apparatus;
a note associated with the file has been recorded;
content of a note associated with the file; or
a cross-reference to another file recorded in the immutable ledger.

18. A computer-implemented method comprising:
obtaining a hash of a file to be transmitted from a sending apparatus to a receiving apparatus and an indication of a file creator of the file;
retrieving, from one of local storage or cloud storage, an immutable identifier associated with the file creator based on the indication of the file creator;
storing the hash of the file, associated with the immutable identifier of the file creator and with one or more assertions provided by an authorized third party, in an immutable ledger;
obtaining the hash of the file from the receiving apparatus;
verifying that the hash of the file is stored in the immutable ledger;
retrieving, from the immutable ledger, at least one of the one or more assertions provided by the authorized third party and associated with the file;
retrieving, from the immutable ledger, the associated immutable identifier of the file creator using the hash of the file; and
transmitting, to the receiving apparatus:
a confirmation that the file is from the file creator; and
the retrieved at least one of the one or more assertions provided by the authorized third party and associated with the file.

19. One or more non-transitory computer-readable media storing instructions that, when executed by a computer, cause the computer to:
- obtain a hash of a file to be transmitted from a sending apparatus to a receiving apparatus and an indication of a file creator of the file;
- retrieve, from one of local storage or cloud storage, an immutable identifier associated with the file creator based on the indication of the file creator;
- store the hash of the file, associated with the immutable identifier of the file creator and with one or more assertions provided by an authorized third party, in an immutable ledger;
- obtain the hash of the file from the receiving apparatus;
- verify that the hash of the file is stored in the immutable ledger;
- retrieve, from the immutable ledger, at least one of the one or more assertions provided by the authorized third party and associated with the file;
- retrieve, from the immutable ledger, the associated immutable identifier of the file creator using the hash of the file; and
- transmit, to the receiving apparatus:
  - a confirmation that the file is from the file creator; and
  - the retrieved at least one of the one or more assertions provided by the authorized third party and associated with the file.

\* \* \* \* \*